(12) United States Patent
Kang et al.

(10) Patent No.: US 8,049,755 B2
(45) Date of Patent: Nov. 1, 2011

(54) CHARACTER INPUT METHOD FOR ADDING VISUAL EFFECT TO CHARACTER WHEN CHARACTER IS INPUT AND MOBILE STATION THEREFOR

(75) Inventors: Tae-Young Kang, Uijeongbu-si (KR); Dong-Uk Lee, Seoul (KR); Myoung-Hwan Han, Seoul (KR); Jin-Gyu Seo, Seoul (KR); Nho-Kyung Hong, Seoul (KR); Chang-Hoon Lee, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 700 days.

(21) Appl. No.: 11/444,864

(22) Filed: Jun. 1, 2006

(65) Prior Publication Data

US 2006/0276234 A1    Dec. 7, 2006

(30) Foreign Application Priority Data

Jun. 1, 2005    (KR) .................. 10-2005-0046918

(51) Int. Cl.
   *G06T 13/00* (2011.01)
(52) U.S. Cl. ......... 345/473; 345/472; 345/471; 345/467
(58) Field of Classification Search .................. 345/418, 345/473, 474, 475, 472, 156, 471, 948, 467, 345/536; 382/177, 182, 187, 229
   See application file for complete search history.

(56) References Cited

U.S. PATENT DOCUMENTS

| | | | | |
|---|---|---|---|---|
| 4,952,051 A | * | 8/1990 | Lovell et al. | 352/87 |
| 5,565,888 A | * | 10/1996 | Selker | 715/823 |
| 5,742,779 A | * | 4/1998 | Steele et al. | 715/839 |
| 5,973,676 A | * | 10/1999 | Kawakura | 345/173 |
| 6,057,858 A | | 5/2000 | Desrosiers | |
| 6,091,505 A | | 7/2000 | Beaman et al. | |
| 6,176,780 B1 | * | 1/2001 | Miyamoto et al. | 463/4 |
| 6,359,615 B1 | * | 3/2002 | Singh | 345/173 |
| 6,417,844 B1 | * | 7/2002 | Kodama | 345/173 |
| 6,504,545 B1 | | 1/2003 | Browne et al. | |
| 6,525,749 B1 | * | 2/2003 | Moran et al. | 715/863 |
| 6,575,468 B1 | * | 6/2003 | Hall | 273/298 |
| 6,690,395 B2 | * | 2/2004 | Mou et al. | 715/763 |
| 6,803,923 B1 | * | 10/2004 | Hamburg | 345/629 |
| 6,909,439 B1 | * | 6/2005 | Amro et al. | 345/660 |
| 6,924,803 B1 | * | 8/2005 | Girling et al. | 345/473 |
| 6,928,613 B1 | * | 8/2005 | Ishii et al. | 715/726 |

(Continued)

FOREIGN PATENT DOCUMENTS

CN    1588350    3/2005

(Continued)

*Primary Examiner* — Andrew Wang
*Assistant Examiner* — Abderrahim Merouan
(74) *Attorney, Agent, or Firm* — The Farrell Law Firm, P.C.

(57) ABSTRACT

Disclosed is a apparatus and a method for displaying various character effects on a character input screen of a mobile station using a differentiated graphic element according to a key input signal. In the method a visual character theme set by a user is displayed in a character input mode, and a character input effect corresponding to the visual character theme is shown according to a key input signal. Accordingly, since the mobile station can show a visual character input effect in every key input sequence by allowing the user to select a desired visual character theme in advance, an entertaining effect is added to a user interface of the mobile station.

17 Claims, 8 Drawing Sheets

U.S. PATENT DOCUMENTS

| | | |
|---|---|---|
| 7,102,628 B2 * | 9/2006 | LeKuch et al. ............... 345/182 |
| 7,106,275 B2 * | 9/2006 | Brunner et al. ................ 345/32 |
| 2003/0017856 A1 * | 1/2003 | Kotchick et al. .............. 455/566 |
| 2003/0110450 A1 * | 6/2003 | Sakai ............................ 715/529 |
| 2003/0112244 A1 * | 6/2003 | Matsuyama ................ 345/473 |
| 2003/0184591 A1 * | 10/2003 | Youn et al. ................... 345/783 |
| 2004/0021691 A1 * | 2/2004 | Dostie et al. ................. 345/773 |
| 2004/0083111 A1 * | 4/2004 | Rehbein et al. .................. 705/1 |
| 2004/0083429 A1 * | 4/2004 | Akiyama ..................... 715/513 |
| 2004/0135818 A1 | 7/2004 | Thomson et al. |
| 2004/0138959 A1 * | 7/2004 | Hlavac et al. ................. 705/26 |
| 2006/0066754 A1 * | 3/2006 | Zaima .......................... 348/564 |
| 2006/0242607 A1 * | 10/2006 | Hudson ........................ 715/863 |
| 2007/0013700 A1 * | 1/2007 | Yoon et al. ................... 345/473 |
| 2009/0141029 A1 * | 6/2009 | Zaima .......................... 345/467 |

FOREIGN PATENT DOCUMENTS

| | | |
|---|---|---|
| EP | 0 848 528 | 6/1998 |
| EP | 0 880 090 | 11/1998 |
| EP | 0 902 378 | 3/1999 |
| JP | 10-039727 | 2/1998 |
| JP | 2000-003167 | 1/2000 |
| JP | 2000-035844 | 2/2000 |
| JP | 2000-076236 | 3/2000 |
| JP | 2001-265780 | 9/2001 |
| JP | 2002-051116 | 2/2002 |
| JP | 2005-032133 | 2/2005 |
| JP | 2005-128793 | 5/2005 |
| KR | 10-2003-0046033 | 6/2003 |
| KR | 10-2003-0085212 | 11/2003 |

* cited by examiner (a)  (b)  (c)

(d)  (e)

CHARACTER INPUT METHOD FOR ADDING VISUAL EFFECT TO CHARACTER WHEN CHARACTER IS INPUT AND MOBILE STATION THEREFOR

PRIORITY

This application claims priority under 35 U.S.C. §119 to an application entitled "Character Input Method For Adding Visual Effect To Character When Character Is Input And Mobile Station Therefor" filed in the Korean Intellectual Property Office on Jun. 1, 2005 and assigned Ser. No. 2005-46918, the contents of which are incorporated herein by reference.

BACKGROUND OF THE INVENTION

1. Field of the Invention

The present invention relates generally to a mobile station, and in particular, to a character input method for adding various effects to a character displayed on a screen when the character is input and a mobile station therefor.

2. Description of the Related Art

Recently, as mobile stations have become more popular, they have incorporated additional functions so that users of the mobile stations can use the mobile stations for these additional functions in addition to a phone communication function. Moreover, in scope with the expansion of various services and additional functions, a mobile terminal's display screen size and color palette has also increased Due to the users' demands being more various and detailed than in the past, the screen space of the mobile stations must now be used more efficiently using various methods. Accordingly, screen space should be used such that, various demands of the users are satisfied and a user is not inconvenienced.

However, although current mobile stations can generate sound and images desired by users using a download service, when a recipient's number is input or a short message is edited, characters having the same font shape and/or size are typically used.

For example, a mobile station displays a number having a single font shape illustrated in FIG. 1(A) when a user presses a key when dialing. The number having a normal size or double size as the font size. When the user continues to dial, input numbers fill a screen as illustrated in FIG. 1(B), and if the user continues to press more keys, the input numbers are converted to a smaller font size and displayed as illustrated in FIG. 1(C). When the user presses a "call" key, an image of trying to connect a call to the input recipient's number is displayed as illustrated in FIG. 1(D).

FIG. 2 is a structural diagram illustrating a conventional dialing screen having a layered structure. The conventional dialing screen includes a background layer 10 for providing a single unicolor background image, a character input layer 20 for displaying key-input data according to a key press, and an icon layer 30 for informing of a current operation state according to the key press by displaying icons or images. That is, the icon layer 30 displays icons of various shapes, such as a telephone shape representing a conversation state and a speaker shape representing a sound setting item.

Accordingly, when a conventional mobile station displays key-input data input by a user when dialing, the conventional mobile station simply displays monotonous key-input data having an assigned font shape and size. That is, in the character display method described above, the mobile station does not allow the user to set various methods such as an assignment of the font size and color of characters.

As described above, a conventional mobile station displays a character by changing the font size and color of the character according to setting of a user when the character is input. Accordingly there is a need for a mobile station which can display a user selected font type, size, and color.

SUMMARY OF THE INVENTION

An object of the present invention is to substantially solve at least the above problems and/or disadvantages and to provide at least the advantages below. Accordingly, an object of the present invention is to provide a character input method for adding a visual effect to a character when the character is input in order to reflect a user's personal style and individuality, and a mobile station therefor.

Another object of the present invention is to provide a character input method for adding a visual effect to a character so that various images can be displayed when the character is input in order to efficiently use various colors and an image magnification function of a mobile station and a mobile station therefor.

According to one aspect of the present invention, there is provided a character input method for adding a visual effect to a character when the character is input to a mobile station, the method including the steps of selecting a visual character theme for adding a visual effect to the character and displaying a background image according to the selected visual character theme on a screen of the mobile station; receiving a request for displaying the character; adding the visual effect corresponding to the selected visual character theme to the character; and displaying the visual character to which the visual effect is added on the displayed background image.

According to another aspect of the present invention, there is provided a character input method for adding a visual effect to a character when the character is input to a mobile station, the method including the steps of displaying a background image according to a visual character theme provided by the mobile station using a background layer and displaying an input character on a screen of the mobile station to which the visual character theme is set by adding a visual effect to the input character using a character input layer.

According to another aspect of the present invention, there is provided a mobile station adding a visual effect to an input character, the mobile station including a memory for storing a plurality of visual character themes, data of a display item for each layer according to each visual character theme, and a visual character theme selected by a user as a default visual character theme; a key input unit for generating key input data according to a key input signal when a display of a character on a screen of the mobile station according to the character input is requested; a controller for adding a visual effect corresponding to the default visual character theme stored in the memory to the input character and controlling a display unit to display the input character to which the visual effect is added on a background image according to the default visual character theme; and the display unit for displaying the input character to which the visual effect is added by overlapping the background image according to the default visual character theme under a control of the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
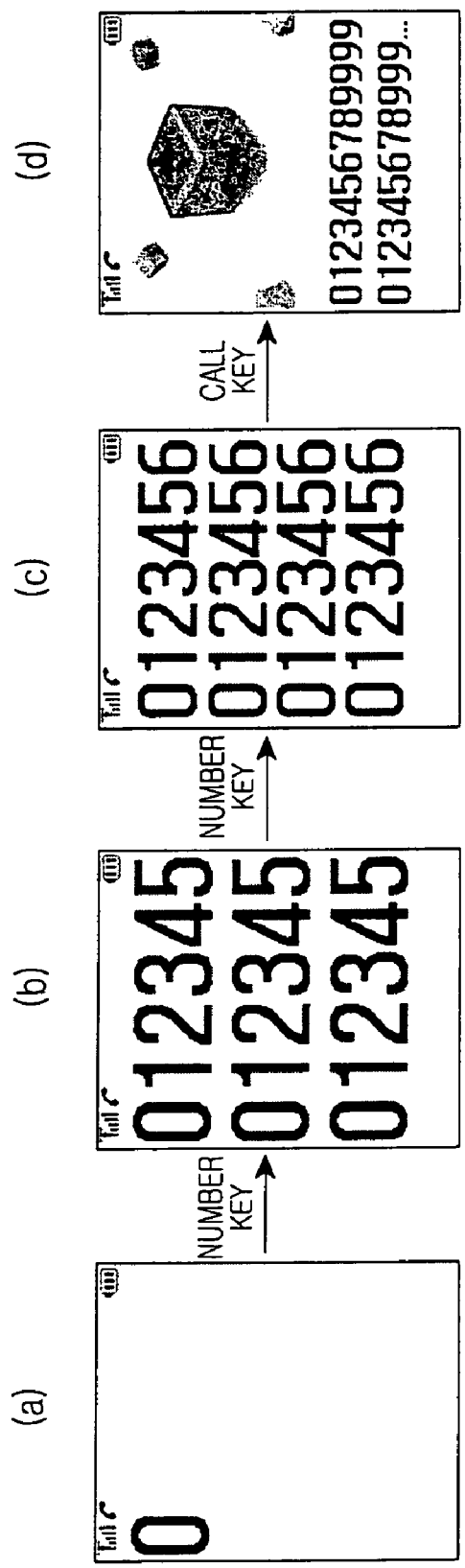
FIG. 1 illustrates screens of a conventional mobile station when dialing.
Figure 2:
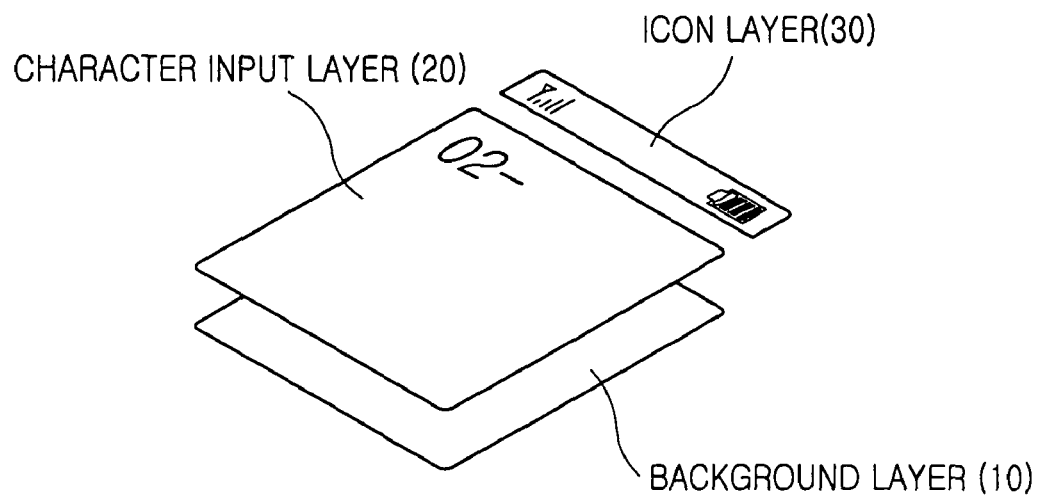
FIG. 2 is a schematic structural diagram of layers of a conventional dialing screen.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention implements a function of displaying various character effects on a character input screen of a mobile station by using a differentiated graphic element according to a key input signal. To do this, a visual character theme set by a user is displayed in a character input mode, and a character input effect corresponding to the visual character theme is shown according to a key input signal. Accordingly, since the mobile station can show a visual character input effect for every key input sequence by allowing the user to select a desired visual character theme in advance, an entertaining effect can be added to a user interface of the mobile station.

Components and operations of a mobile station having the function described above will now be described with reference to FIG. 3 which is a block diagram of a mobile station according to the present invention. Hereinafter, the character is the general term for any sign which can be displayed on a screen, such as an English character, a Korean character, a number, and a special character (e.g., "*", "!", etc).

Figure 3:
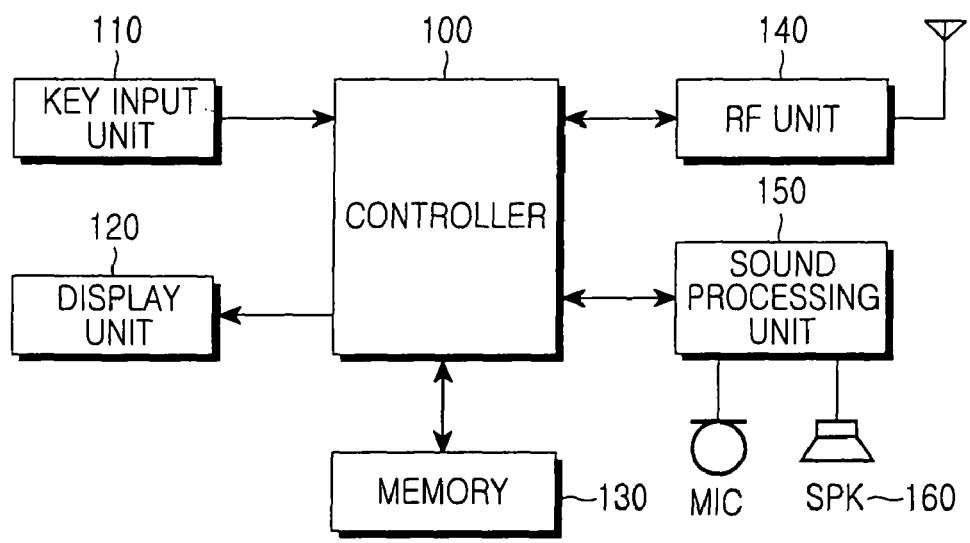
FIG. 3 is a block diagram of a mobile station according to a preferred embodiment of the present invention.

Referring to FIG. 3, the mobile station includes a controller 100, a key input unit 110, a display unit 120, a memory 130, a radio frequency (RF) unit 140, and a sound processing unit 150.

The controller 100 controls all operations of the mobile station, and particularly, controls the display unit 120 to display a character input effect according to a preferred embodiment of the present invention. Herein, the character input effect is displayed differently according to a pre-set visual character theme, and if effect sound is included in the visual character theme, the controller 100 controls the display unit 120 to display the character input effect and simultaneously controls the sound processing unit 150 to output the effect sound through a speaker every time a character is input.

As described above, when a character display on a screen is requested by inputting a character, the controller 100 adds a visual effect corresponding to the pre-set visual character theme to the input character and displays the visual-effect-added character on a background image displayed according to the visual character theme. For example, the character input effect can be displayed in all character input modes such as a phone-call mode in which a user inputs a recipient's number to make a phone call and a message edit mode in which a message is input and/or edited.

In another case, the controller 100 can display visual effect added characters even when a display of characters received through a Short Message Service (SMS) or a Multimedia Message Service (MMS) is requested. Herein, a message received from another party's mobile station through the SMS or MMS can be processed by a corresponding message processing control unit included in the controller 100, i.e., an SMS or MMS character processing unit. For example, when a message according to a visual character theme is received, to display the message edited by the other party's mobile station, a corresponding message processing control unit determines whether a corresponding visual character theme exists. If it is determined that the visual character theme exists, the corresponding message processing control unit displays visual-effect-added characters according to the visual character theme when the message is displayed. Likewise, it is preferable that a display of visual characters to which a visual effect according to a visual character theme is added be always applicable in all cases where a character display is required besides in the character input modes.

The key input unit 110 provides an interface with the user, has various types of keys such as various function keys, number keys (e.g., 0 to 9), and special keys (e.g., * and #), and provides key input data corresponding to a key pressed by the user to the controller 100. That is, the key input unit 110 generates key input data unique to each key input signal and outputs the generated key input data to the controller 100. The controller 100 detects which key corresponds to the key input data and performs a corresponding operation according to the detection result.

The control unit 100 controls the display unit 120 to receive display data corresponding to the key input data from the key input unit 110 and display the display data, or display an operational state and a plurality of types of information of the mobile station using icons and characters. In addition, when the user sets or operates a needed function, the control unit 100 controls the display unit 120 to visually display a state of the setting or operation so that the user is informed as required. Moreover, the display unit 120 to which the present embodiment is applied displays a visual character effect by which a visual effect is added to a character input by the user in the character input mode.

The memory 130 is includes a ROM (Read Only Memory) and RAM (Random Access Memory) for storing a plurality of programs and data. In particular, according to a preferred embodiment of the present invention, the memory 130 stores data of a display item for each layer according to a visual character theme. The memory 130 also stores a plurality of visual character themes and stores a visual character theme set by the user as a default visual character theme.

The RF unit 140 is connected to the controller 100, converts sound data and control data to an RF signal and transmits the RF signal, and receives an RF signal and converts the received RF signal to sound data and control data.

The sound processing unit 150 is connected to the controller 100, converts sound data input from the controller 100 to audible sound and outputs the audible sound through the speaker 160, and converts a sound signal received through a microphone to sound data and transmits the sound data to the controller 100. In addition, the sound processing unit 150 to which the present embodiment is applied outputs effect sound according to a corresponding visual character theme whenever a character input effect according to a character input is displayed on the screen. For example, if a visual character theme is "steel", a steel plate (not shown) is displayed as a background image, and when a key is pressed, a character corresponding to the key can be displayed on the steel plate as the character is carved on steel, and simultaneously, a striking hammer effect sound can be output through the speaker.

A layered structure of a screen of a mobile station having the above-described configuration on which a predetermined character input effect is displayed when a character is input will now be described.

Figure 4:
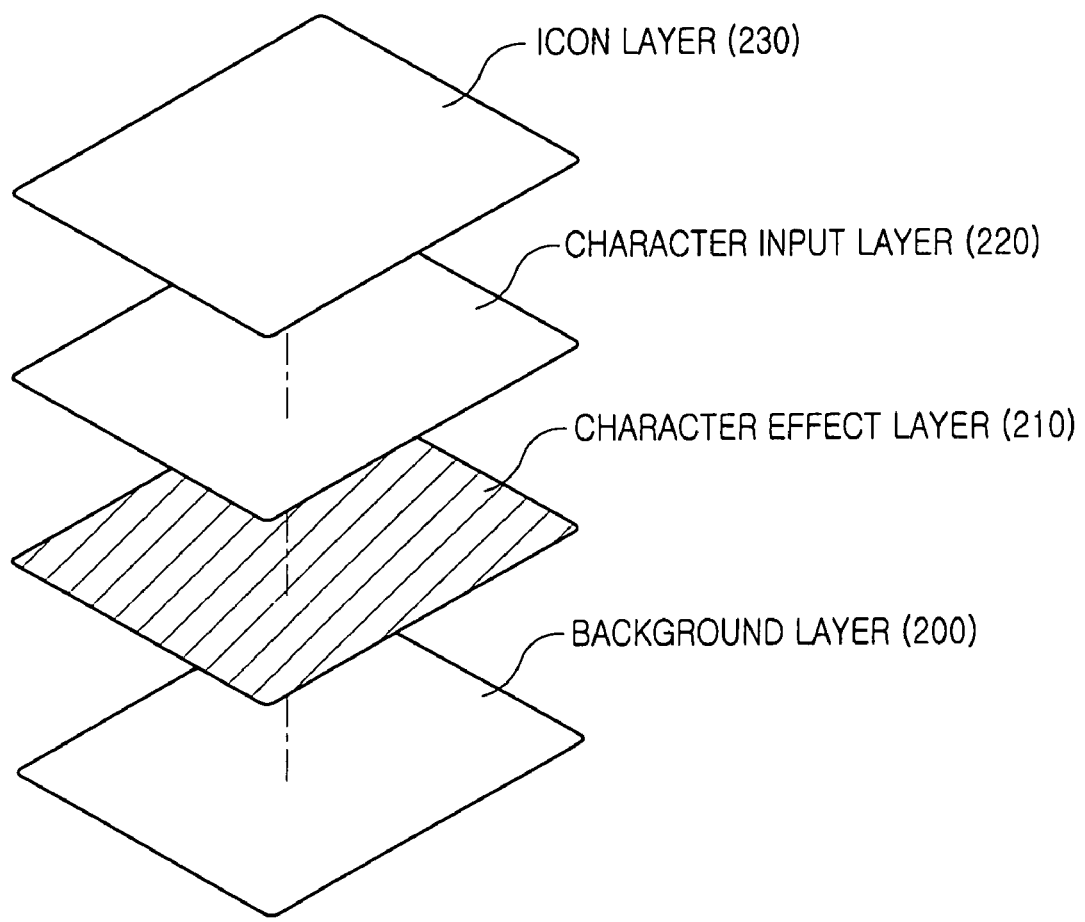
FIG. 4 is a schematic structural diagram of layers of a character input screen in a mobile station according to a preferred embodiment of the present invention.

FIG. 4 is a schematic structural diagram of layers of a character input screen in a mobile station according to the present invention. The character input screen of the mobile station according to the present invention basically includes a background layer 200 for displaying a background image according to a visual character theme and a character input layer 220 for displaying an input character by not changing a font of the character but adding a visual effect to the character, and further includes a character effect layer 210 for displaying a pre-defined specific visual effect on a background portion on which the input character is displayed or on the entire screen in order to add a visual effect to the input character and an icon layer 230 for displaying images of various input tools when the character is input. Herein, the visual effect is usually overlapped on the background image of the visual character theme provided by the background layer 200, so that the character can be visually distinguished from the character effect. In addition, an icon indicating an input device provided by the icon layer 230 is overlapped on the background image of the visual character theme, as well as the character and the character effect.

In more detail, the background layer 200 displays the background image of the visual character theme using the entire screen (or a substantial portion thereof) of the mobile station. According to a preferred embodiment of the present invention, the character effect layer 210 can display various effects, such as a wave effect or a flame effect, around a location of a displayed cursor or at which characters are being displayed. For example, when the background image of the visual character theme is a lake, a character is displayed by the character input layer 220 on the lake background image provided by the background layer 200, and then the character effect layer 210 can give such an effect that tiny waves rise below a current cursor, below displayed characters, and/or all over the screen. By doing this, a character is displayed on water in what appears to be three dimensions. Additionally, an effect of tiny waves rising and falling can be provided when a character is input.

To add a visual effect to a character corresponding to each key input signal, the character input layer 220 displays the character using various graphic elements and various fonts, such as an ink pen font, a light bulb font, a Post-it™ font, and a twinkle font. The icon layer 230 displays an ink-pen image as an input tool image when a visual effect added character, for instance, having the ink-pen font, is displayed by overlapping the background image (e.g., letter paper image) of the visual character theme. For example, when the visual effect added character is displayed, the icon layer 230 displays an image indicating an input tool tracing strokes of the character in order to give a feeling of writing the character for a user. While the character strokes are being drawn according to a drawing sequence, the image indicating the input tool simultaneously moves to trace the character strokes, and when the character is fully drawn, the image indicating the input tool is displayed at the ending point of the character strokes. Additionally, an optional scratching sound (e.g., a sound similar to a quill scratching paper as it draws a character can be played by the speaker as the character is drawn.

Figure 5:
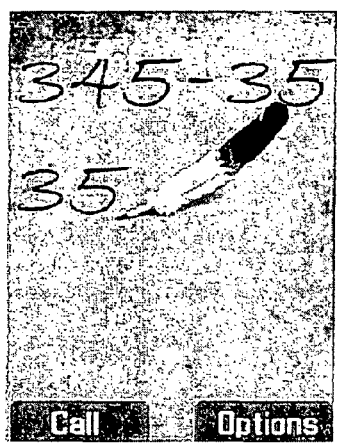
FIG. 5 illustrates visual character effects in a mobile station according to a preferred embodiment of the present invention.
Figure 5:
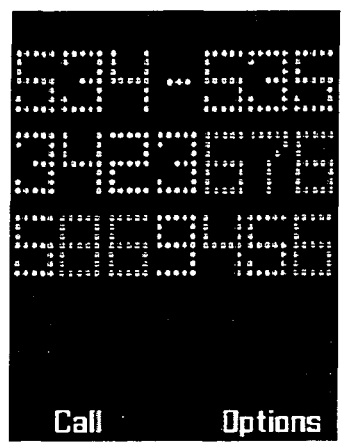
Figure 5:
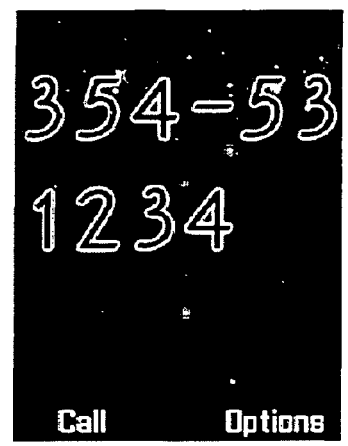
Figure 5:
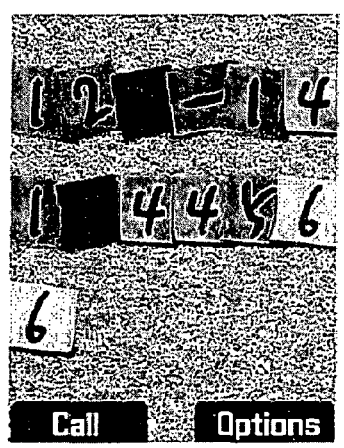
Figure 5:
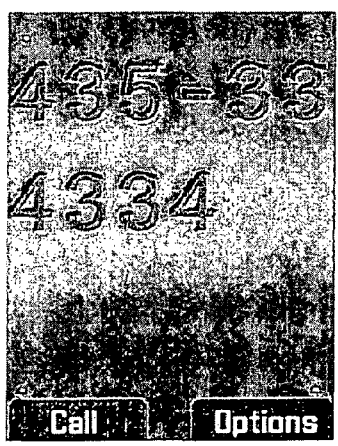

The character input screen is provided to the user as illustrated in FIG. 5, and a character input effect corresponding to each visual character theme is displayed when the user inputs a character. According to a preferred embodiment of the present invention, visual character themes having various character input effects, such as an ink pen theme illustrated in FIG. 5(A), an LED panel theme illustrated in FIG. 5(B), a twinkle theme illustrated in FIG. 5(C), a Post-it™ theme illustrated in FIG. 5(D), a steel theme illustrated in FIG. 5(E), and a blackboard theme (not shown), can be used. While FIG. 5 illustrates the ink pen, LED panel, twinkle, Post-it™, and steel themes according to a preferred embodiment of the present invention, the present invention is not limited to this. That is, visual character themes having various character input effects can be displayed according to a selection of the user, a service provider, or a mobile station manufacturer. In addition, the character input effects according to a preferred embodiment of the present invention can be created by the user, or received by a content provider as a kind of content and modified according to a selection of the user.

There are various methods of displaying a visual-effect-added character on the character input layer 220 according to the present invention. Three of these methods will now be described below.

The first method of displaying a visual-effect-added-character is known as an animated pen input method in which a character is drawn to trace strokes of the character corresponding to a key input signal as writing the character for the user when a key is pressed, i.e., a method of inputting a character by adding an animation effect thereto. In this method, animated pen input data of each input character is stored in the mobile station, a corresponding visual character theme is set, and then if a certain character is input to the character input screen, animated pen input data corresponding to the input character is displayed. Although a method of storing and displaying animated pen input data of each input character is illustrated, it is also possible to set an animated pen effect and move an animated pen to trace an input character by adding drawing sequence information of the input character to the animated pen effect. When this animated pen effect is used, the animated pen input method can be used not only when a simple number key is pressed but also when a character having a high degree of freedom, such as a drawing input through a touch screen or a separate input tool, is input.

To describe in more detail the animated pen input method, reference will be made to FIG. 5(A), which illustrates the ink pen theme as a visual character theme. This method is achieved by allocating a drawing sequence of a corresponding character to each key in advance. For example, when a number key is pressed for dialing, the controller 100 of the mobile station obtains a drawing sequence allocated in advance to correspond to the input number and draws character strokes of the input number according to the drawing sequence. When a character other than a number is input, strokes of the input character are also drawn according to a drawing sequence of the character, thereby being displayed on the screen. Besides, for the LED panel theme illustrated in FIG. 5(B), when a character key is pressed, a character corresponding to the character key is displayed in a form of illuminating LEDs according to a drawing sequence of the character. As another example, for the twinkle theme illustrated in FIG. 5(C), when a character key is pressed, a character corresponding to the character key is displayed in a form of sequentially flashing starlight on a universe background image according to a drawing sequence of the character.

The second method of displaying a visual-effect-added-character is known as a collage method of displaying a character by loading a stored character image corresponding to a key input signal when a key is pressed. For example, referring to the Post-it™ theme illustrated in FIG. 5D, when a number key is pressed, a number image having a Post-it™ form corresponding to the number key is loaded and displayed. That is, character images are loaded and displayed one-by-one when keys are pressed in a feeling of attaching "Post-it™" on a cork wall or other background.

The third method of displaying a visual-effect-added-character is known as a relief method of displaying a character as embossing or intaglioing the character when a key is pressed. For example, referring to the steel theme illustrated in FIG. 5(E), when a number key is pressed, a number corresponding to the number key is displayed as being raised in relief on a steel plate. Likewise, effects according to each visual character theme can be variously provided.

A process of setting one of visual character themes displayed variously as described above will now be described with reference to FIG. 6 which is a flowchart illustrating a process of setting a visual character theme according to the present invention.

Figure 6:
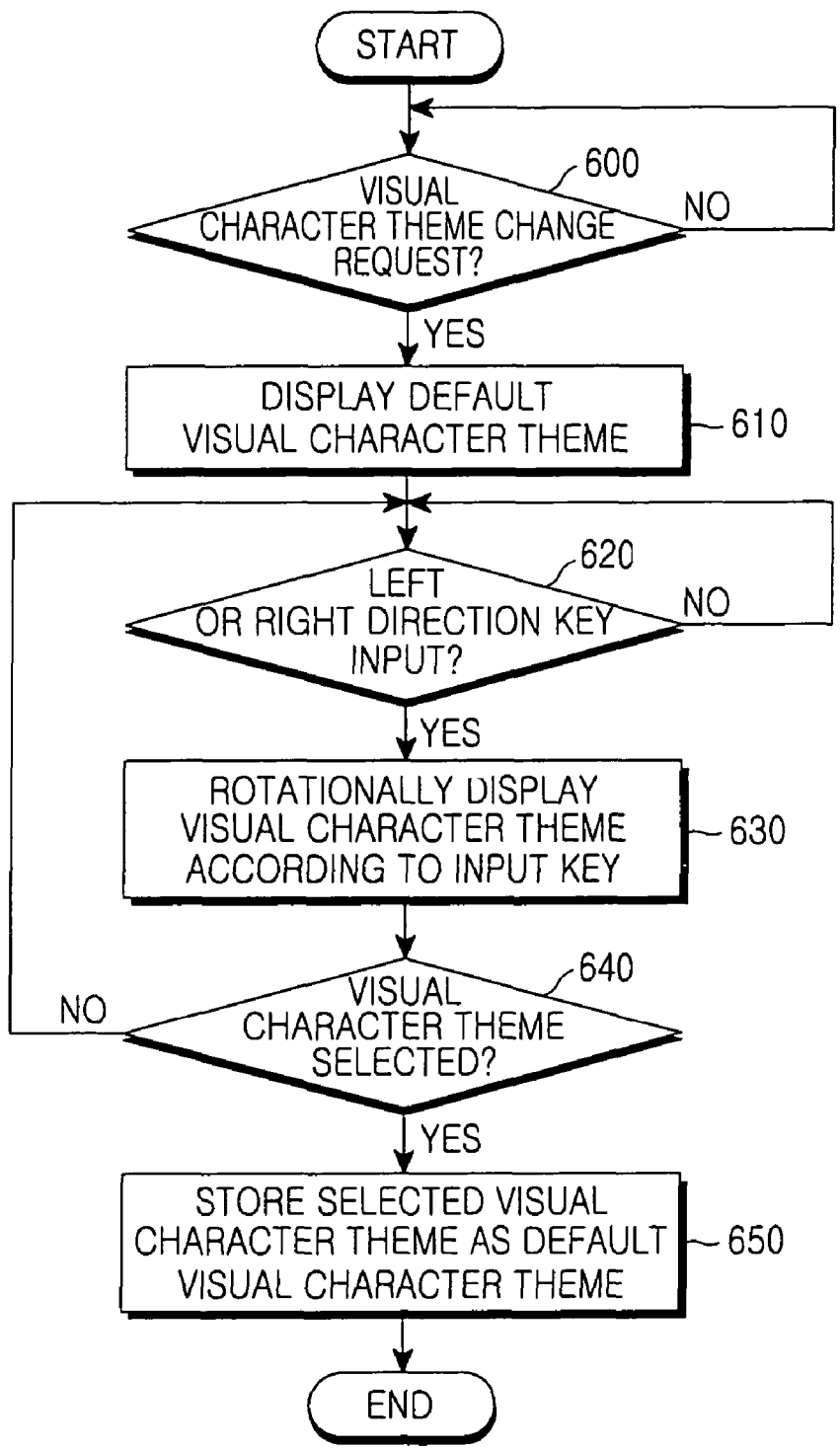
FIG. 6 is a flowchart illustrating a process of setting a visual character theme according to a preferred embodiment of the present invention.

Referring to FIG. 6, the controller 100 determines in step 600 whether a request to change a visual character theme is input by a user. The request can be achieved by the user selecting a visual character theme change menu from a main menu. As a result of the determination in step 600, if a request to change a visual character theme is input, the controller 100 displays a default visual character theme in step 610. In step 620, the controller 100 determines whether a left or right direction key is pressed. That is, for the user's convenience, the user can see another visual character theme using the direction key in the present embodiment. As a result of the determination in step 620, if the left or right direction key is pressed, the controller 100 rotationally displays another visual character theme in a left or right direction according to the key input signal in step 630. In step 640, the controller 100 determines whether one of a plurality of visual character themes is selected by the user. As a result determined in step 640, if a certain visual character theme is selected, the controller 100 stores the selected visual character theme as the default visual character theme in step 650. Thereafter, the user can use a desired visual character theme.

A process of displaying the visual character theme selected as described above will now be described with reference to FIG. 7 which is a flowchart illustrating a process of adding a visual effect to character using a layered structure of a character input screen according to the present invention.

Figure 7:
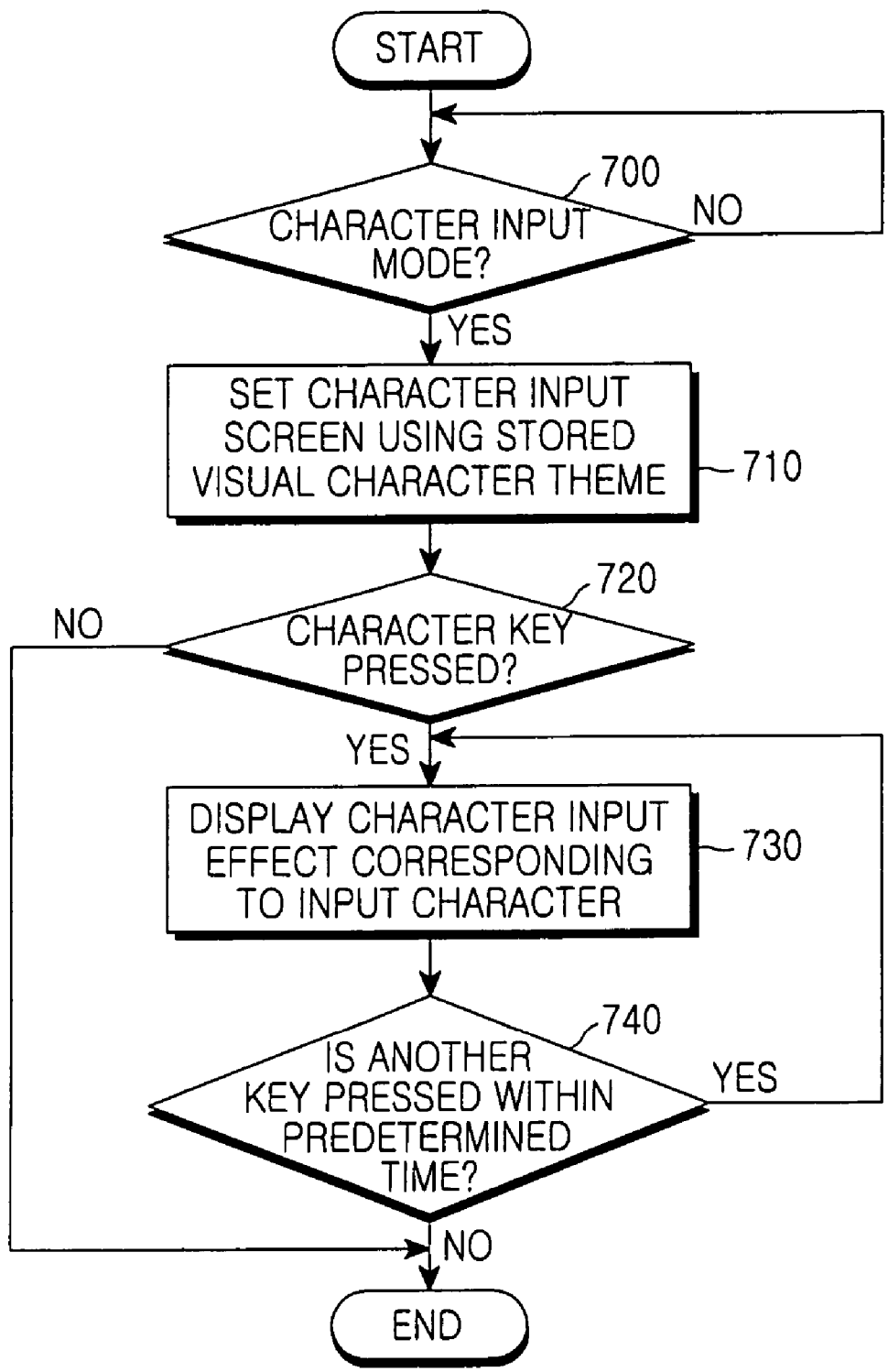
FIG. 7 is a flowchart illustrating a process of adding a visual effect to a character using a layered structure of a character input screen according to a preferred embodiment of the present invention.

Referring to FIG. 7, if a character input mode is selected by the user in step 700, in step 710, the controller 100 loads a stored default visual character theme and sets the character input screen using the default visual theme. That is, the controller 100 displays a background image corresponding to the default visual character theme on the character input screen through the background layer 200. Herein, if the default visual character theme is achieved in a manner of writing a character for the user, an input tool image is displayed through the icon layer 230 (e.g., a corresponding animated pen is displayed on the background image). In step 720, the controller 100 determines whether a character key is pressed. Herein, the character key is a key for inputting any sign which can be displayed on a screen, such as an English character, a Korean character, a number, and a special character.

If a character key is pressed, the controller 100 displays a character input effect according to the default visual character theme in response to a key input signal corresponding to the character key in step 730. In more detail, when the key input unit 110, for instance, senses that the user presses the character key and transmits key input data to the controller 100, the controller 100 adds a visual-effect-corresponding to the default visual character theme to an input character according to the key input data. Then, the controller 100 displays the visual-effect-added character on the background image displayed according to the default visual character theme. In step 740, the controller 100 determines whether another key is pressed within a predetermined time, i.e. whether a character key is further pressed. As a result of the determination in step 740, if another a character or key is pressed, the controller proceeds to step 730 and displays an input-visual-effect-added character on the background image according to the default visual character theme by following the displayed character.

A detailed example using the present invention will now be described with reference to FIGS. 8 and 9.

Figure 8:
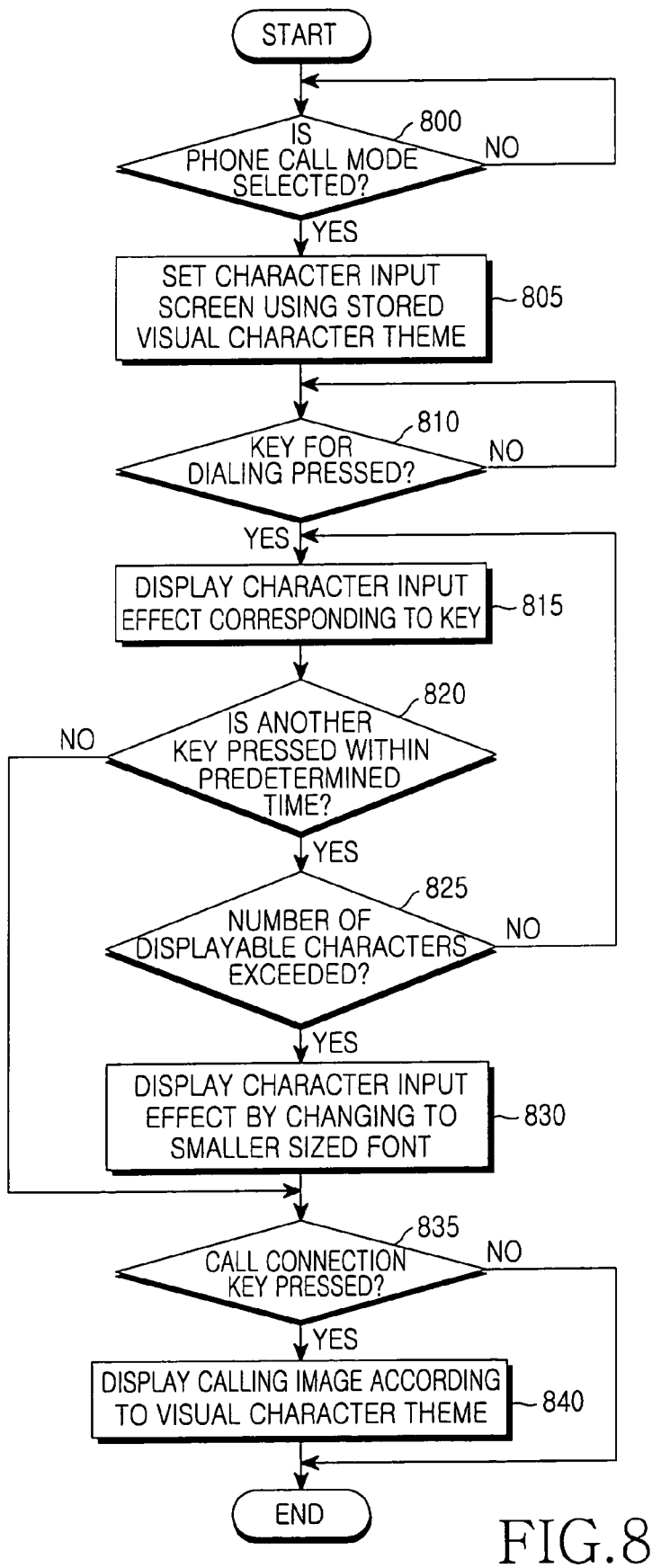
FIG. 8 is a flowchart illustrating a method of adding a visual effect to a character according to a preferred embodiment of the present invention.
Figure 9:
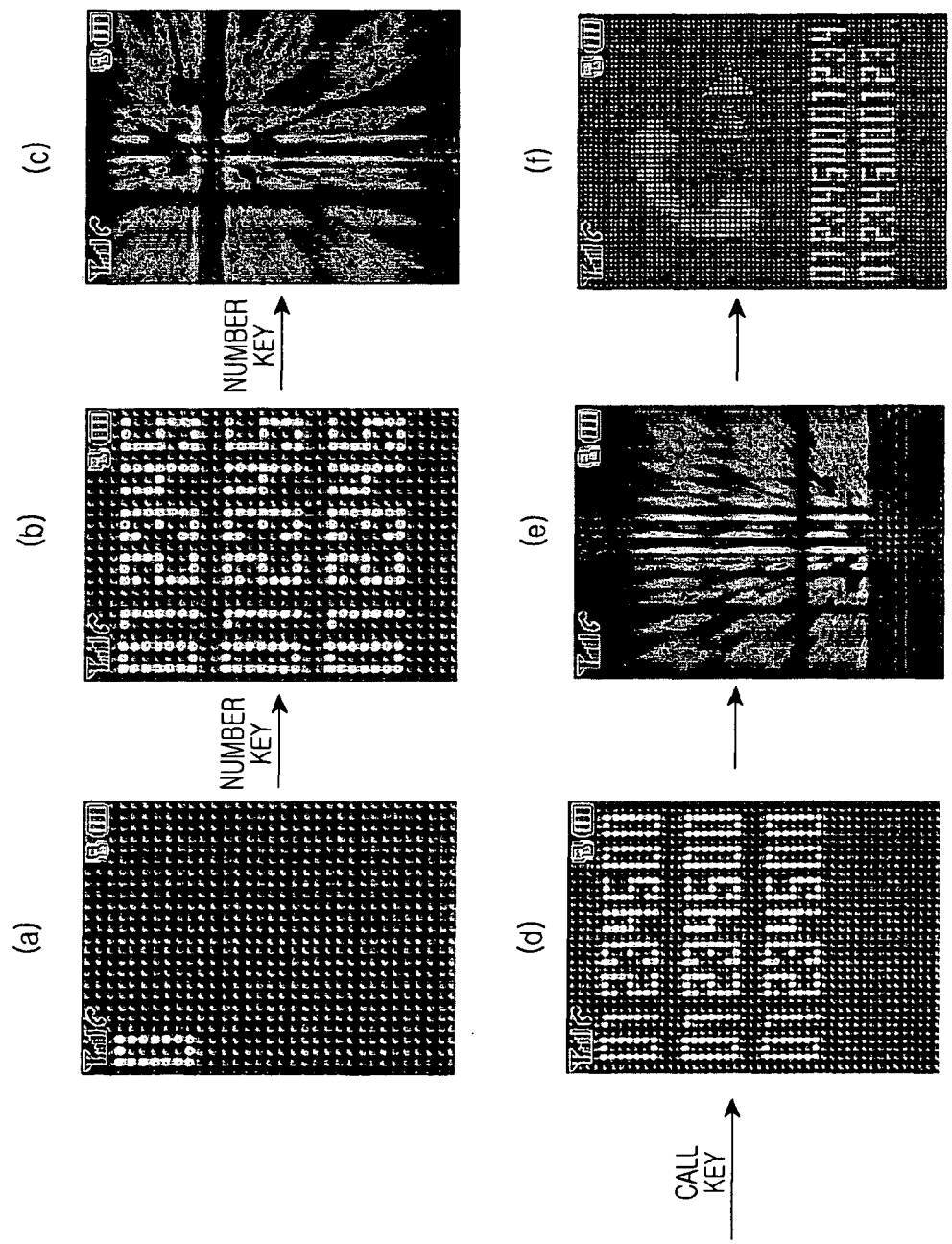
FIG. 9 illustrates screen shots showing visual effects added to a character according to a preferred embodiment of the present invention.

FIG. 8 is a flowchart illustrating a method of providing a character input effect according to the present invention, and FIG. 9 illustrates screen shots showing the character input effect according to the present invention.

Although an example will now be described by illustrating FIGS. 8 and 9, the method of providing a character input effect according to a preferred embodiment of the present invention should not be construed as limited to the embodiment shown in FIGS. 8 and 9.

Referring to FIGS. 8 and 9, if a phone call mode is selected in step 800 by the user in the layered screen structure illustrated in FIG. 4, the controller 100 sets a character input screen using a stored visual character theme in step 805. That is, a background image corresponding to the default visual character theme is displayed through the background layer 200. Herein, if the default visual character theme is a light bulb theme, an LED panel background image is displayed through the background layer 200. In step 810, the controller 100 determines whether a key for dialing is pressed. As a result in the determination in step 810, if a key for dialing is pressed, the controller 100 displays a pre-defined character input effect on the background image in response to a key input signal corresponding to the key in step 815. For example, an effect of illuminating light bulbs as illustrated in FIG. 9A is displayed. Herein, the effect can be achieved by sequentially illuminating the light bulbs displayed on the LED panel background image according to a drawing sequence of a character corresponding to the key or illuminating the light bulbs at once.

In step 820, the controller 100 determines whether another key is pressed within a predetermined time. As a result of the determination in step 820, if another key is pressed, the controller 100 determines in step 825 whether the number of characters which can be displayed on the screen is exceeded. As a result of the determination in step 825, if a character corresponding to the key can be displayed on the screen, the controller 100, by proceeding back to step 815, adds the character input effect to the character and displays the character on the screen next to the previously displayed character. While repeating the above-described procedures in the same manner according to subsequently pressed keys, the controller 100 determines in step 825 whether the number of characters which can be displayed on the screen is exceeded. As a result of the determination in step 825, if the number of characters which can be displayed on the screen is exceeded, i.e., if the screen is filled up by input characters as illustrated in FIG. 9B, the controller 100 changes a current image to an image having a smaller sized font as illustrated in FIG. 9(D) in step 830. Herein, to present a visually pleasing effect when the images are changed, the controller 100 may display a zoom-out image for temporarily displaying a flash on the LED panel background image as illustrated in FIG. 9(C).

In a state where a recipient's number is input as illustrated in FIG. 9(D), the controller 100 determines in step 835 whether a call connection key for trying to make a phone call with the recipient's number is pressed. As a result of the determination in step 835, if the call connection key is pressed, the controller 100 displays a calling image according to a visual character theme illustrated in FIG. 9(F) in step 840. Herein, when the recipient's number input image is changed to the calling image, the controller 100 may also display a zoom-out image illustrated in FIG. 9(E).

As described above, according to embodiments of the present invention, by suggesting a method of providing a character input layer and a character input effect according to the layer, an entertainment element can be added to a user interface of a mobile station.

While the invention has been shown and described with reference to a certain preferred embodiment thereof, it will be understood by those skilled in the art that various changes in form and details may be made therein without departing from the spirit and scope of the invention. For example, while a visual character effect has been described only for a character input mode and a message receiving mode, the visual character effect can be applied to various modes in which a visual character can be displayed. Therefore, the spirit and scope of the invention will be defined by the appended claims and the equivalent not by the described preferred embodiments.

What is claimed is:

1. A character input method for displaying an alphanumeric character when the alphanumeric character is input to a mobile station, the method comprising the steps of:
   determining whether a character input event occurs for the alphanumeric character;
   checking a visual character theme for adding an animation effect corresponding to the visual character theme to the input alphanumeric character when the character input event occurs;
   loading a background image corresponding to the visual character theme;
   loading animated character data according to the visual character theme in response to the character input event, the animated character data being the input alphanumeric character with the animation effect added; and
   displaying the animated character data,
   wherein the input alphanumeric character implemented by the animated character data is drawn by tracing strokes of the input alphanumeric character on the background image, and
   wherein the animated character data is displayed on a screen of the mobile station, the screen having at least, in order from a bottom, a background layer displaying the background image, a character effect layer displaying the animation effect, and a character input layer displaying the animated character data.

2. The method of claim 1, wherein the displaying step further comprises displaying the animated character data by using an animated pen input method including checking information of a drawing sequence corresponding to each key input signal and drawing the animated character data on the background image according to the drawing sequence.

3. The method of claim 2, wherein the animated pen input method comprises loading an animated pen corresponding to the animated character data; and moving the animated pen according to the drawing sequence.

4. The method of claim 1, further comprising outputting a sound effect corresponding to the visual character theme when the animated character data is displayed.

5. The method of claim 1, further comprising displaying a pre-defined effect at a location which is below a current cursor, below the displayed animated character data, or throughout the screen, when the animated character data is displayed.

6. The method of claim 1, wherein the determining step further comprises determining whether displaying the animated character data is made by inputting the alphanumeric character through the character input screen.

7. The method of claim 1, wherein the determining step further comprises displaying the animated character data by a message processing control unit of the mobile station.

8. The method of claim 1, further comprising:
   determining whether a visual character theme change request is input in a state where a background image according to a default visual character theme is displayed; and
   loading background images respectively corresponding to stored visual character themes and displaying rotationally the loaded background images in response to the visual character theme change request.

9. The method of claim 8, wherein the stored visual character themes comprises at least an ink pen theme.

10. The method of claim 9, wherein when the visual character theme is the ink pen theme, the background image according to the default visual character theme is a letter paper image, and the animated character data is displayed to show an effect that a character corresponding to the input alphanumeric character is drawn on the letter paper image and a writing tool icon moving according to a drawing sequence assigned to the animated character data is simultaneously displayed.

11. A character input method for displaying an alphanumeric character when the alphanumeric character is input to a mobile station, the method comprising the steps of:
   displaying a background image according to a visual character theme provided by the mobile station on a screen of the mobile station, the screen having at least, in order from a bottom, a background layer displaying the background image, a character effect layer displaying an animation effect corresponding to the visual character theme, and a character input layer displaying animated character data, the animated character data being the input alphanumeric character with the animation effect added; and
   displaying the animated character data,
   wherein the input alphanumeric character implemented by the animated character data is drawn by tracing strokes of the input alphanumeric character on the background image.

12. The method of claim 11, further comprising displaying the character effect layer with a pre-defined effect added to a background image portion.

13. The method of claim 11, further including displaying an animated pen moving according to the drawing sequence corresponding to the input alphanumeric character when the animated character data is displayed by adding the animation effect to the input alphanumeric character on an icon layer.

14. A mobile station for displaying an input alphanumeric character to a user, the mobile station comprising:
- a memory for storing a plurality of visual character themes including a default visual character theme selected by the user;
- a controller for loading from the memory a background image and animated character data associated with the default visual character theme when a character input event occurs for the input alphanumeric character and controlling a display unit of the mobile station to display the animated character data, wherein the input alphanumeric character implemented by the animated character data is drawn by tracing strokes of the input alphanumeric character on the background image; and
- a screen disposed in the display unit for displaying the animated character data, the screen having at least, in order from a bottom, a background layer displaying the background image, a character effect layer displaying an animation effect corresponding to the default visual character theme, and a character input layer displaying the animated character data.

15. The mobile station of claim 14, further comprising a sound processing unit for outputting a sound effect when the animated character data is displayed when the default visual character theme includes the sound effect.

16. A character input method for displaying an alphanumeric character when the alphanumeric character is input to a mobile station, the method comprising the steps of:
- determining whether a character input event occurs for the input alphanumeric character;
- checking a visual character theme for adding an animation effect corresponding to the visual character theme to the input alphanumeric character when the character input event occurs;
- loading a background image corresponding to the visual character theme; and
- displaying at least one character image according to a number of the character input event, the character image being allocated to the input alphanumeric character,
- wherein the character image is displayed on a screen of the mobile station, the screen having at least, in order from a bottom layer, a background layer displaying the background image, and a character input layer displaying the character image.

17. The method of claim 16, wherein displaying the at least one character image further comprises displaying, according to a relief method, each character image embossed or intaglioed on the background image.

* * * * *